June 5, 1923.
A. B. MYERS
SAFETY VALVE
Filed April 13, 1921
1,457,544
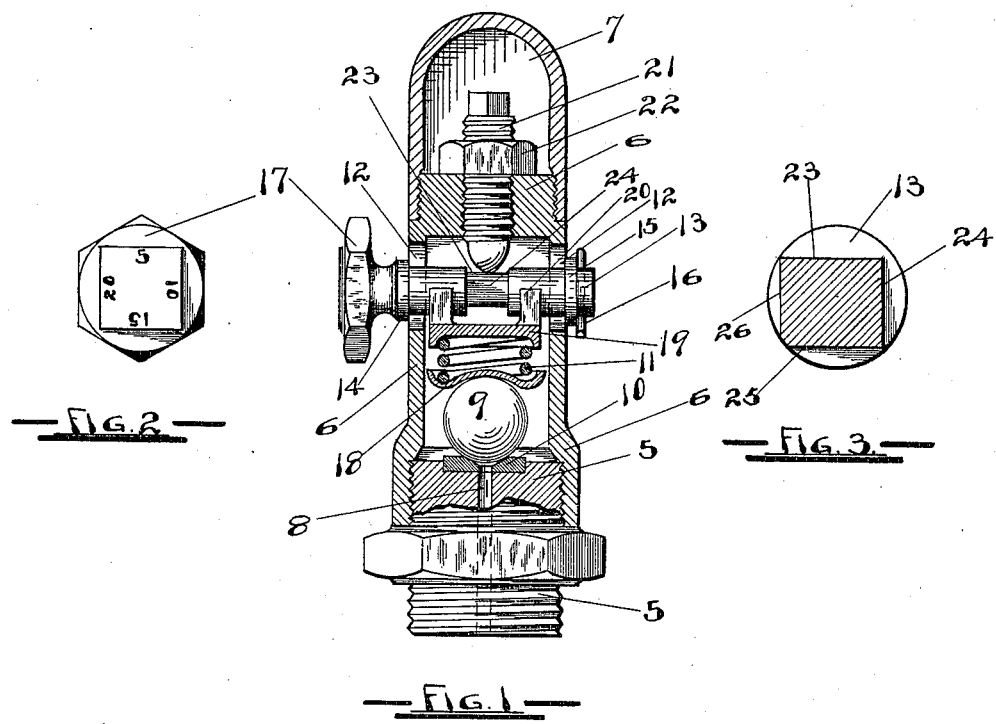
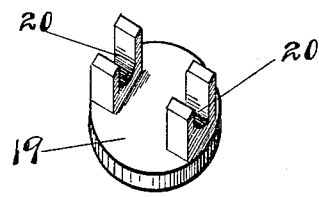
INVENTOR.
ALFRED B. MYERS
BY
C. F. Blake
ATTORNEY.

Patented June 5, 1923.

1,457,544

UNITED STATES PATENT OFFICE.

ALFRED B. MYERS, OF GATES, OREGON.

SAFETY VALVE.

Application filed April 13, 1921. Serial No. 460,949.

*To all whom it may concern:*

Be it known that I, ALFRED B. MYERS, a citizen of the United States, residing at Gates, Marion County, State of Oregon, have invented certain new and useful Improvements in Safety Valves, of which the following is a specification.

My invention relates to safety valves in general, and particularly to a type of such valves adapted for use with air brake mechanism and the like, the object of my invention being to provide in such a valve means of quick adjustment of the pressure for which the valve is set to open, such means being of graduated form and the graduations of small variations one from the other.

I accomplish the above object by means of the construction illustrated in the accompanying drawing, which is a part of this application for Letters Patent, like characters of reference indicating like parts throughout the several views thereof, and in which:

Fig. 1 is a sectional elevation of a safety valve embodying my device.

Fig. 2 is a side elevation of the operating knob.

Fig. 3 is a transverse sectional elevation through the center of the adjusting member.

Fig. 4 is a perspective view of the upper spring perch.

In general my invention consists of a body having a valve controlled orifice therein, a spring to hold the valve controlling said orifice to its seat, an adjusting screw to adjust the tension of the spring, and an adjusting member disposed between said screw and said spring for making further and more minute adjustments of said spring independently of said adjusting screw.

The body of my device consists of a plug 5 adapted to be screwed into the pipe or other member to which the valve is to be attached, a shell 6 secured to said plug, preferably threaded thereto, and a cap 7 threaded or otherwise secured upon the upper end of said shell.

An orifice 8 is provided through the plug 5, and upon the upper end of said plug within the shell 6 is disposed a yieldable washer constructed of rubber, leather, lead or the like, said washer having therethrough an orifice registering with the orifice 8 in the plug 5.

A ball 9 is provided adapted to be seated upon the washer 10 and thus to close the orifice 8, said ball being held to its seat upon the washer 10 by means of a spring 11.

The shell 6 is provided with oppositely disposed slots 12 within which slots is mounted the adjusting member 13. Said adjusting member is cylindrical in form, and is passed entirely through the shell 6 by way of the slots 12, and is held in place by means of a shoulder 14 upon one end of said member and a washer 15 and cotter pin 16 upon the other end of said member, as shown in Fig. 1. The member 13 is rotatable within the slots 12 and also slidable therein longitudinally of the shell 6. A convenient operating knob 17 is made integral with the member 13.

A spring perch 18 is provided for the spring 11 and is adapted to receive the ball 9 therein, and also a spring perch 19 is provided for said spring having suitable seats 20 thereon adapted to receive the cylindrical portions of the adjusting member 13, as shown in Fig. 1.

An adjusting screw 21 is threaded into the top of the shell 6 and adapted to bear upon the adjusting member 13.

By means of this construction the tension of the spring 11 may be adjusted by the screw 21 causing the member 13 to move longitudinally within the slots 12 until the desired tension in the spring is arrived at, when the screw 21 may be locked by means of the nut 22.

The valve is thus set to open at any desired pressure, but as springs weaken in use and other conditions vary it is desirable to provide means of quickly and conveniently adjusting the tension in the spring independently of the screw 21. This I accomplish by providing flat surfaces upon the member 13, with which surfaces the end of the screw 21 contacts.

Each of said flat surfaces, 23, 24, 25 and 26 is at a different distance from the axis of the member 13 from all the other of said surfaces, so that, by turning said member 13 the tension of the spring 11 is varied each time a different one of said surfaces is brought into contact with the screw 21. In this manner minute variations and adjustments in the tension of the spring 11 may be effected independently of the screw 21.

While only four such surfaces upon the member 13 are illustrated in the drawing, they may be as many as desired, and they may be calibrated in reference to the spring 11 so that each such surface represents a certain increase or decrease in the pressure at which the valve will open relative to the adjacent surfaces. The knob 17 may be inscribed with numerals indicating such relative increases and decreases as shown in Fig. 2. If the member 13 is set so that the screw 21 contacts with the surface corresponding to the numeral 10 upon the knob, a quarter turn to the left will increase the opening pressure of the valve five pounds, while a quarter turn to the right will decrease the opening pressure of the valve five pounds.

The slots 12 serve as discharge ports of the valve.

My invention may be made of any size and constructed of any materials deemed convenient and suitable for a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a safety valve: a spring actuated valve; a screw to adjust the tension in the actuating spring of said valve; and means between said actuating spring and said screw to adjust the tension of said spring independently of said screw.

2. In a safety valve: a valve; a spring actuating said valve; means to adjust the tension of said spring; and means between said former means and said spring to further adjust the tension of said spring.

3. A valve; a spring actuating said valve; an adjusting screw axially alined with said spring; and a member rotatably mounted between said spring and said screw comprising means for adjusting the distance therebetween as said member is rotated.

4. A valve; a shell inclosing said valve; a cylindrical member rotatably mounted transversely of said shell and slidable longitudinally of said shell; a spring perch rotatably mounted upon said cylindrical member; a spring intermediate said perch and said valve; a polygonal portion integral with said cylindrical member; and an adjusting screw coacting with said polygonal portion.

In witness whereof I claim the foregoing as my own I hereunto affix my signature in the presence of two witnesses at Portland, county of Multnomah, State of Oregon, this 2nd day of April 1921.

ALFRED B. MYERS.

Witnesses:
L. J. ROBINSON,
C. F. BLAKE.